Sept. 26, 1950     C. WEISMAN     2,523,346
ELECTRIC CONTROLLER

Filed Jan. 29, 1947     2 Sheets-Sheet 1

INVENTOR.
CHARLES WEISMAN
BY M. C. Hayes
ATTORNEY

Patented Sept. 26, 1950

2,523,346

UNITED STATES PATENT OFFICE 2,523,346

ELECTRIC CONTROLLER

Charles Weisman, United States Navy

Application January 29, 1947, Serial No. 724,936

3 Claims. (Cl. 201—48)

(Granted under the act of March 3, 1883, as amended April 30, 1928; 370 O. G. 757)

This invention relates to improvements in gages and more particularly to gages adapted to indicate the weight and disposition of weight of an object such as a vehicle borne on inflated tires.

For purposes of illustration, the invention is described with reference to its use on aircraft, it being understood that it is not so limited in application but can be employed to determine the weight and disposition of weight of any object borne on inflated tires.

Aerodynamics teaches the significance of load weight and disposition of load weight as factors in initiating and sustaining flight and in maintaining maneuverability in flight, and prescribes maxima therefor. Accordingly, present practice entails calculating total weight by adding the weights of each item in the load and calculating center of gravity by approximating the clockwise and counterclockwise moments of said weights. Although slide-rules adapted to expedite the making of such calculations have been devised, the disadvantages of present methods are numerous: They are time-consuming, require specially trained personnel, and are subject to errors in results occasioned during communication, interpretation and computation of the figures.

The primary object is to provide a gage of simple construction adapted to indicate the weight and the disposition of weight of an object such as a vehicle borne on inflated tires.

Another object is to provide a gage adapted to indicate weight and balance directly.

A further object is to provide a gage of negligible weight adapted to be affixed to the inflated tires of a vehicle in such a manner as to indicate remotely weight and balance of said vehicle.

Further objects and advantages of this invention, as well as its construction, arrangement and operation, will be apparent from the following description and claims in connection with the accompanying drawings, in which Fig. 1 is an elevation of a component member of a gage, partly in section, showing a preferred embodiment of the invention;

Similar numerals refer to similar parts throughout the several views.

Figure 3:
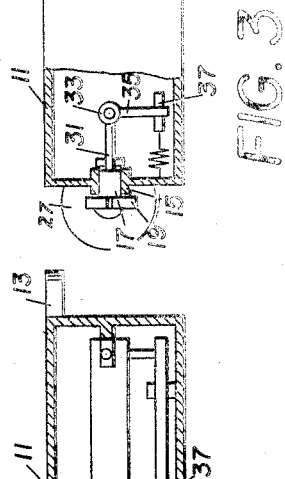
Fig. 3 is an end view thereof, partly in section.

A housing 11 is provided with a plurality of spaced lugs 13 adapted to secure said housing to a strut carrying an inflated tire.

A bearing 15 machined in a wall of said housing 11 carries a shaft 17, and the arm 19 of a feeler-arm assembly 21 is mounted on said shaft 17 at an angle thereto, said arm 19 being adapted to rotate said shaft. The feeler-arm assembly 21 comprises said arm 19, an extension arm 23 hinged to said arm 19 at the end thereof and adapted to rotate on the fulcrum of said hinge in the plane of rotation of the shaft, means to retain said arms in axial alignment, such as spring 25, and a feeler-wheel 27 mounted on the end of the extension arm 23.

A lever arm 29 mounted on the shaft 17 within the housing 11 and adapted to be rotated by said shaft extends from said mount to the leg 31 of a bell crank, being adapted to reciprocate said leg 31 on its fulcrum 33. Said fulcrum 33 is secured to the wall of the housing by suitable means. Said bell crank is provided with a second leg 35, with a lever arm 37 depending from the end thereof. Said lever arm 37 is provided with a hook portion 39 at the end thereof, the interior side of said hook portion having a gear rack 41; a pin 43 positioned proximate the leg 35 and secured to the housing in such a manner that said arm pivots thereon responsive to reciprocation of the leg 35; and a spring 45 secured to said arm 37 and the housing 11 and adapted to restore said arm 37 to the position from which it was moved by actuation of the bell crank.

A gear 47 is mounted in the housing 11 so that the teeth 49 thereof engage the teeth of the gear rack 41. Said gear 47 carries a radius arm 51 provided with a first contact point 53 proximate the end of said arm adapted to contact a first resistance 55 and a second contact point 52 adapted to contact a second resistance 59. Said resistances are arcuate in shape to assure contact of their respective contact points over a substantial portion of their lengths.

A stop 61 secured to a wall of the housing 11 is adapted to limit the range of movement of the lever arm 37.

Figure 1:
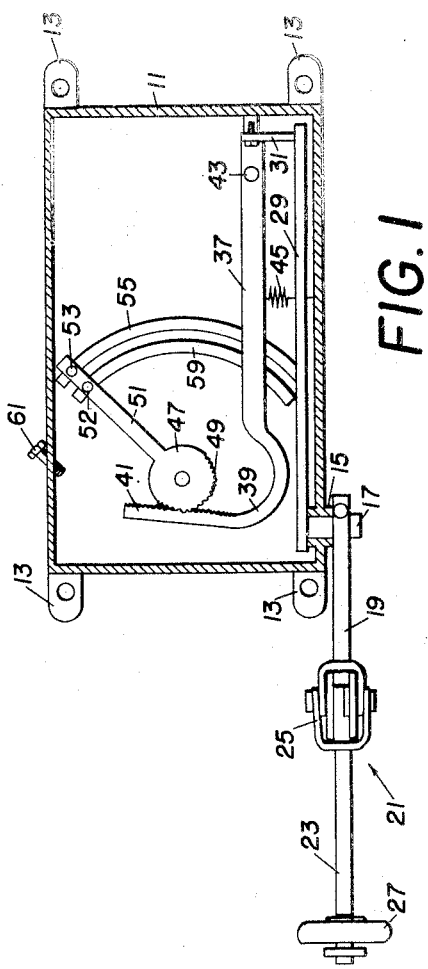
Figure 2:
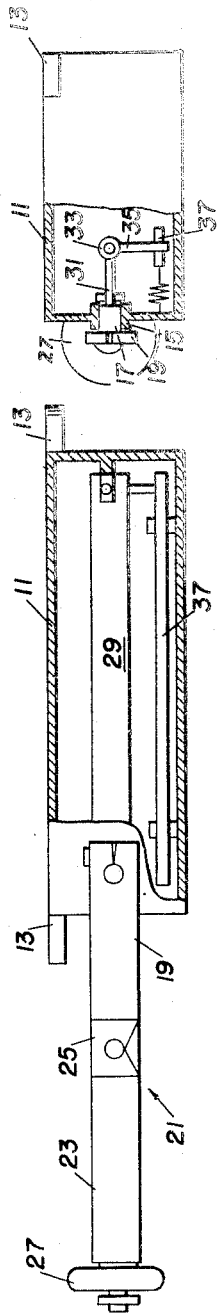
Fig. 2 is a side view thereof, partly in section.
Figure 4:
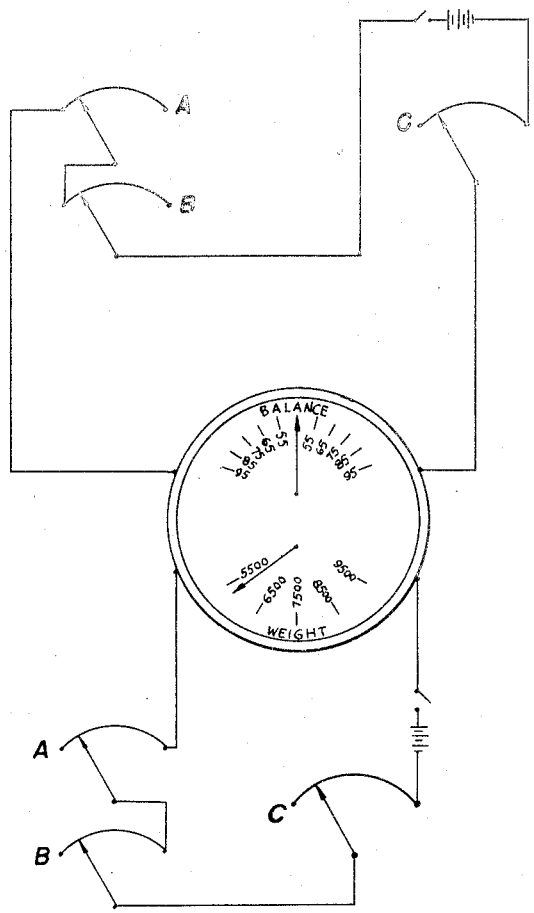
Fig. 4 is a schematic diagram showing the wiring circuits of the gage.

As shown in Fig. 4, a plurality of the component members illustrated in Figs. 1 to 3 are employed in the gage: One such member is secured to a strut of each main wheel A and B, and another member secured to the nose or tail wheel C in such a manner that a feeler-wheel 27 abuts a point on a wall of each said wheel. The wiring is so arranged that one of the resistances of each component member, a source of electrical energy, a switch, and a calibrated first gage adapted to indicate increase or decrease in resistance in the circuit are in series and so that deflection of the feeler-wheel 27 at the wheels A and B increases the resistance in the circuit while deflection of the feeler-wheel 27 at the wheel C decreases the resistance in the circuit. The second resistance of each component member, a source of electrical energy, a switch, and a calibrated second gage adapted to indicate decrease in resistance in the circuit comprise a second circuit wherein deflection of the feeler-wheel 27 at the wheels A, B and C decrease resistance in said second circuit.

When component members of the construction above described, provided with resistances of suitable values and ranges, are secured in the manner indicated and the switches closed, the first gage indicates neutral or balanced disposition of weight, and the second gage indicates zero load weight. As load is added, the tire walls bulge responsive said load, thereby deflecting the abutting feeler-wheels 27.

Through the system of levers and the bell crank above described, the movement of the feeler-wheel 27 is translated to rotation of the gear 47 responsive movement of the rack 41, thereby varying the resistance in each circuit. It is apparent that increase of the load over the wheels A and B disturbs balance of the first circuit and deflects the indicator of the gage thereof in one direction, while increase of the load over the wheel C disturbs the balance of the first circuit and deflects the indicator of the gage thereof in the opposite direction. On the balance gage, the sum of the increase of resistance at A and B must equal the decrease of resistance at C when load is applied in order to cause the needle to remain on the zero position of balance. It is further apparent that increase of the load over any wheel additively deflects the indicator of the gage of the second circuit by decreasing the resistance therein.

Various modifications and changes can be made in the subject device without departing from the scope of the invention.

The invention described herein may be manufactured and used by or for the Government of the United States of America for governmental purposes without the payment of any royalties thereon or therefor.

I claim:

1. In a gage having a first indicator responsive to variations in the resistance of a first circuit and a second indicator responsive to variations in the resistance of a second circuit, the combination of a feeler-wheel mounted on an arm depending from a shaft secured in a housing and rotatable responsive to expansion of the wall of a wheel abutting said feeler-wheel, a gear within said housing rotatable responsive to movement of a rack driven by said shaft through a train of levers, a radius arm on said gear carrying a plurality of contact points, and a plurality of resistances within said housing responsive variably to movement of said contact points and adapted to selectively vary the resistance of each of said circuits.

2. In a gage, a housing, a shaft journaled in said housing, a feeler-wheel mounted on an arm carried by said shaft external said housing, electrical circuits each having a resistance mounted in said housing, and means to vary each of said resistances, said means being actuated by rotation of said shaft and including wiping contacts for said resistances that can be shifted a distance greater than the distance of travel of said feeler-wheel.

3. In a gage, a housing, a shaft journaled in said housing, a feeler-wheel mounted on an arm carried by said shaft external said housing, an electrical circuit including a resistance mounted in said housing, and means actuated by rotation of said shaft to vary said resistance, said means comprising a first arm carried by said shaft within said housing, a bell crank actuated by rotation of said arm, a second arm bearing a rack rotated by rotation of said bell crank, and a gear rotated by said rack, said gear carrying a third arm having a contact point adapted to make wiping contact with said resistance and thereby vary the effective length thereof.

CHARLES WEISMAN.

REFERENCES CITED

The following references are of record in the file of this patent:

UNITED STATES PATENTS

| Number | Name | Date |
|---|---|---|
| 1,407,078 | Murray | Feb. 21, 1922 |
| 1,688,330 | Gunther | Oct. 23, 1928 |
| 1,718,957 | Hillix | July 2, 1929 |
| 1,986,695 | Warner | Jan. 1, 1935 |
| 2,235,930 | Huggins | Mar. 25, 1941 |
| 2,265,077 | Manning et al. | Dec. 2, 1941 |